(12) United States Patent
Jaiswal et al.

(10) Patent No.: US 12,517,190 B2
(45) Date of Patent: Jan. 6, 2026

(54) METHOD OF MANUFACTURING MAGNETORESISTANCE ELEMENT USING LASER PINNING PROCESS

(71) Applicant: Allegro MicroSystems, LLC, Manchester, NH (US)

(72) Inventors: Samridh Jaiswal, London (GB); Paolo Campiglio, Arcueil (FR); Sundar Chetlur, Frisco, TX (US)

(73) Assignee: Allegro MicroSystems, LLC, Manchester, NH (US)

( * ) Notice: Subject to any disclaimer, the term of this patent is extended or adjusted under 35 U.S.C. 154(b) by 666 days.

(21) Appl. No.: 18/049,359

(22) Filed: Oct. 25, 2022

(65) Prior Publication Data
US 2024/0133977 A1 Apr. 25, 2024
US 2024/0230792 A9 Jul. 11, 2024

(51) Int. Cl.
*G01R 33/00* (2006.01)
*G01R 33/09* (2006.01)

(52) U.S. Cl.
CPC ....... *G01R 33/0052* (2013.01); *G01R 33/093* (2013.01); *G01R 33/098* (2013.01)

(58) Field of Classification Search
CPC . G01R 33/0052; G01R 33/093; G01R 33/098
See application file for complete search history.

(56) References Cited

U.S. PATENT DOCUMENTS

2005/0087519 A1* 4/2005 Klostermann .... H01L 21/67115
219/121.65
2011/0111133 A1* 5/2011 Zhou ...................... B82Y 25/00
427/547

FOREIGN PATENT DOCUMENTS

TW 1513071 B * 3/2014

* cited by examiner

*Primary Examiner* — Thien S Tran
(74) *Attorney, Agent, or Firm* — DALY, CROWLEY, MOFFORD & DURKEE, LLP

(57) ABSTRACT

In one aspect, a method of manufacturing a magnetoresistance (MR) element having layers include ramping up a temperature of a reference layer of the MR element to an annealing temperature of the reference layer by increasing an amplitude of laser pulses applied to the reference layer over time to an amplitude that corresponds to the annealing temperature of the reference layer; applying a magnetic field to the reference layer; and maintaining the amplitude of subsequent laser pulses over time that have the amplitude that corresponds to the annealing temperature of the reference layer until at least the reference layer is annealed.

5 Claims, 12 Drawing Sheets

METHOD OF MANUFACTURING MAGNETORESISTANCE ELEMENT USING LASER PINNING PROCESS

BACKGROUND

A magnetic-field sensing element is used to describe a variety of electronic elements that can sense a magnetic field. The magnetic-field sensing element can be, but is not limited to, a Hall Effect element, a magnetoresistance (MR) element, or a magnetotransistor. As is also known, there are different types of magnetoresistance elements, for example, a semiconductor magnetoresistance element such as Indium Antimonide (InSb), a giant magnetoresistance (GMR) element, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

An MR element includes a reference layer. The magnetization direction of the reference layer determines a direction where the MR element is most sensitive to changes in a magnetic field. A magnetization direction of the reference layer can be pinned in a desired direction by heating the reference layer to a particular temperature, applying a magnetic field on the reference layer in the desired direction, and subsequently cooling the reference layer in the presence of the magnetic field.

A laser pinning process is a pinning methodology primarily used in angle sensors to pin the magnetization directions of the reference layers for each individual X and Y bridge, which enables the feature of locally setting two distinct directions and obtain a full 0 to 360 degree of functionality on the same die.

SUMMARY

In one aspect, a method of manufacturing a magnetoresistance (MR) element having layers includes ramping up a temperature of a reference layer of the MR element to an annealing temperature of the reference layer by increasing an amplitude of laser pulses applied to the reference layer over time to an amplitude that corresponds to the annealing temperature of the reference layer; applying a magnetic field to the reference layer; and maintaining the amplitude of subsequent laser pulses over time that have the amplitude that corresponds to the annealing temperature of the reference layer until at least the reference layer is annealed.

In a further aspect, a method of manufacturing a magnetoresistance (MR) element having layers includes raising a temperature of an insulator layer of the MR element to a crystallization temperature of the insulator layer by increasing an amplitude of laser pulses applied to the insulator layer over time to an amplitude that corresponds to the crystallization temperature of the insulator layer; maintaining the amplitude of subsequent laser pulses over time that have the amplitude that corresponds to the crystallization temperature of the insulator layer until at least the insulator layer is crystallized; after maintaining the amplitude of subsequent laser pulses over time that have the amplitude that corresponds to the crystallization temperature of the insulator layer, lowering the temperature of the insulator layer by reducing amplitudes of subsequent laser pulses applied to the insulator layer to a temperature that corresponds to an annealing temperature of a reference layer of the MR element; applying the laser pulses that correspond to the annealing temperature of the reference layer of the MR element to the reference layer; maintaining the amplitude of subsequent laser pulses over time that have the amplitude that corresponds to the annealing temperature of the reference layer until at least the reference layer is annealed; and after maintaining the amplitude of subsequent laser pulses over time that have the amplitude that corresponds to the annealing temperature of the reference layer, ramping down the temperature of the reference layer by decreasing an amplitude of subsequent laser pulses applied to the reference layer over time.

DESCRIPTION OF THE DRAWINGS

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAIL DESCRIPTION

Described herein are techniques to fabricate a magnetoresistance (MR) element using a novel laser pinning process that uses a trapezoidal laser pulse profile that includes an envelope of laser pulses than are shorter than traditional laser pinning processes. In one example, the techniques include laser pulses that have amplitudes and/or pulse duration that are modulated. The techniques described herein reduce the risks associated with traditional laser pinning processes, which may apply too much heat to a reference layer thereby damaging the MR element or may not apply enough heat to the reference layer thereby not properly pinning the magnetization direction of the reference layer thereby making the MR element inoperable. In one example, the techniques described herein improve the fabrication of MR elements used in a X-bridge and a Y-bridge of an angle sensor.

Figure 1:
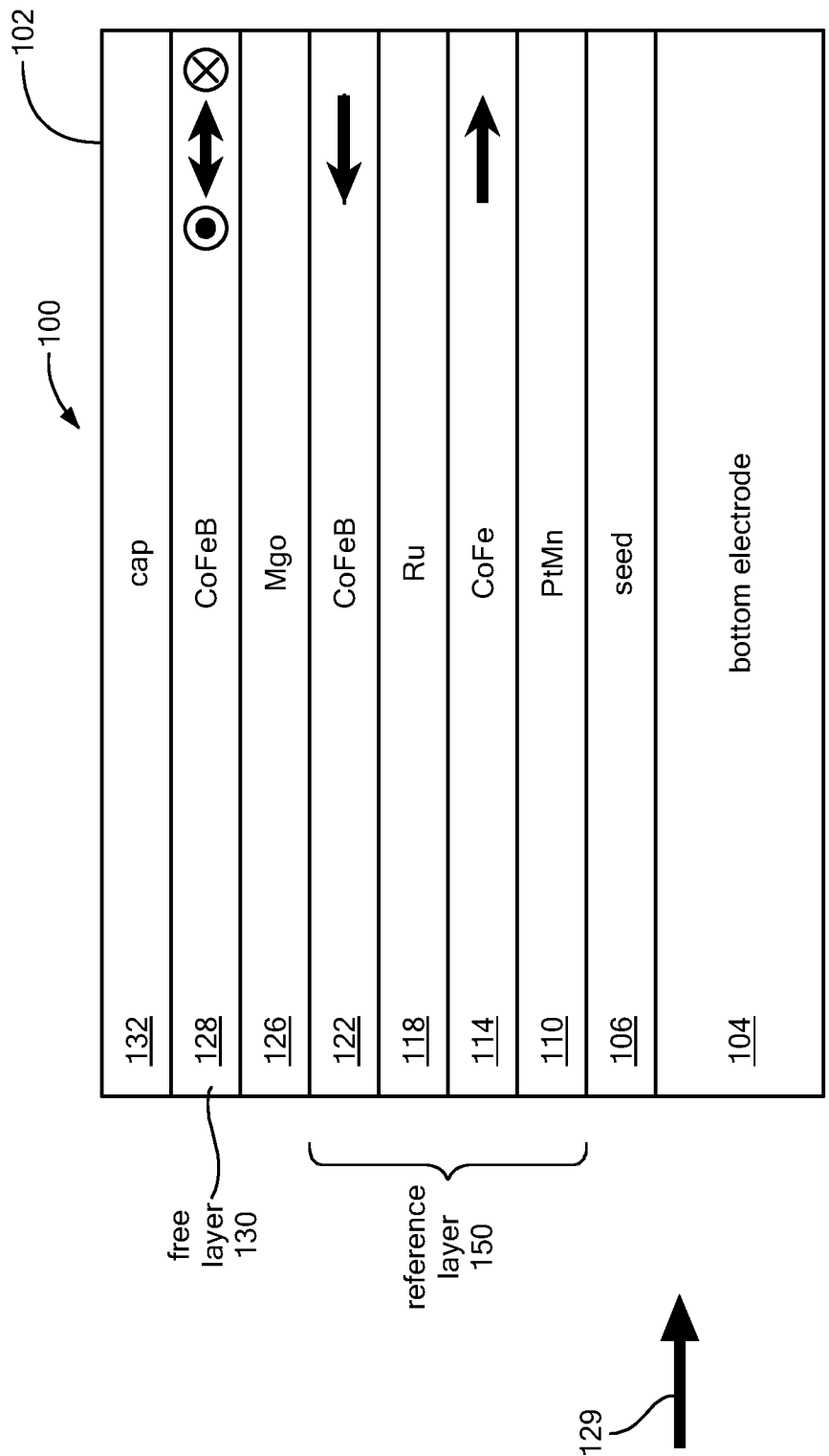
FIG. 1 is a block diagram of a prior art example of a tunneling magnetoresistance (TMR) element.

Referring to FIG. 1, an example of a tunneling magnetoresistance (TMR) is a TMR element 100. The TMR element 100 includes a stack 102 of layers 106, 110, 114, 118, 122, 126, 128, 132 indicative of one example of one pillar of a multi-pillar TMR element. Generally, the layer 106 is a seed layer (e.g., a copper nickel (CuN) layer) with the layer 110 located on the seed layer 106. The layer 110 includes platinum manganese (PtMn) or iridium manganese (IrMn), for example. The layer 114 is located on the layer 110 and the layer 118 is located on the layer 114. In one example, the layer 114 includes cobalt iron (CoFe) and the layer 118 is a spacer layer and includes ruthenium (Ru). On the layer 118, a magnesium oxide (MgO) layer 126 (sometimes called an insulator layer or a barrier layer) is sandwiched between two cobalt iron boron (CoFeB) layers 122, 128. A cap layer 132 (e.g., tantalum (Ta)) is located on the CoFeB layer 128. The layer 114 is a single layer pinned layer that is magnetically coupled to the layer 110. The physical mechanism that is coupling layers 110 and 114 together is sometimes called an exchange bias.

A free layer 130 includes the CoFeB layer 128. In some examples, the free layer 130 may include an additional layer of nickel iron (NiFe) (not shown) and a thin layer of tantalum (not shown) between the CoFeB layer 128 and the NiFe layer.

It will be understood that a driving current running through the TMR element 100 runs through the layers of the stack, running between seed and cap layers 106 and 132, i.e., perpendicular to a surface of a bottom electrode 104. The TMR element 100 can have a maximum response axis that is parallel to the surface of the bottom electrode 104 and that is in a direction 129, and also parallel to the magnetization direction of the reference layer 150, comprised of layers 110, 114, 118, and 122, most notably in the layer CoFeB 122.

The TMR element 100 has a maximum response axis (maximum response to external fields) aligned with the arrow 129, i.e., perpendicular to bias directions experienced by the free layer 130, and parallel to magnetic fields of the reference layer 150, notably pinned layer 122. Also, in general, it is rotations of the magnetic direction of the free layer 130 caused by external magnetic fields that result in changes of resistance of the TMR element 100, which may be due to a change in angle or a change in amplitude if an external bias is present because the sum vector of the external field and the bias is causing a change in the angle between the reference and free layers.

Figure 2A:
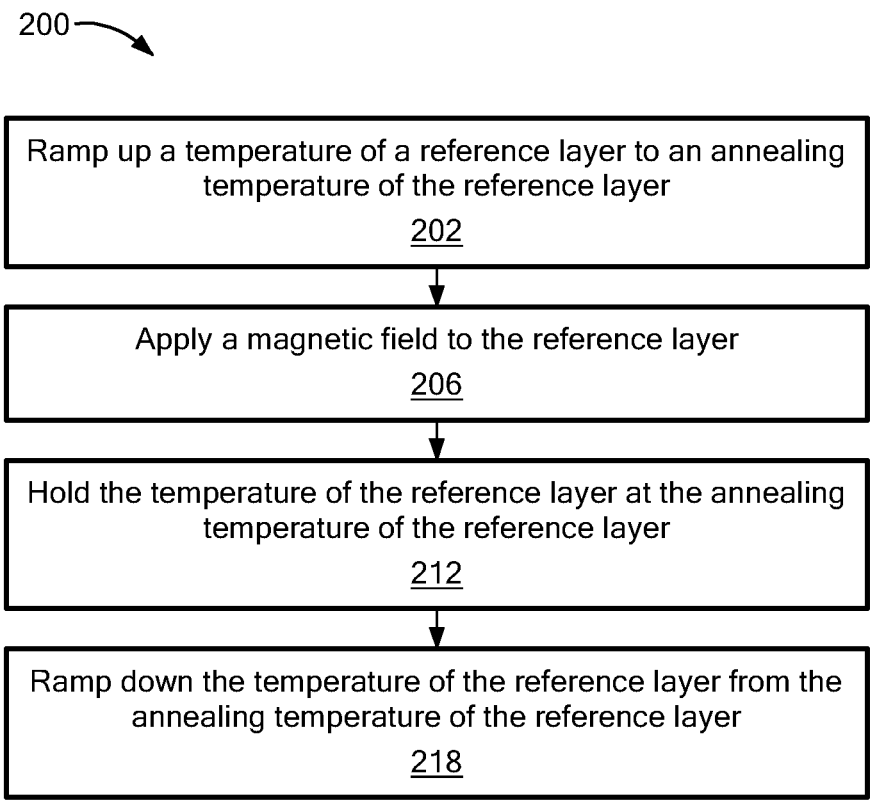
FIG. 2A is a flowchart of an example of a process to pin a magnetization direction of a reference layer.

Referring to FIG. 2A, an example of a process to pin a magnetization direction of a reference layer is a process 200. Process 200 ramps up a temperature of a reference layer to an annealing temperature of the reference layer (202). For example, the reference layer 150 (FIG. 1) is heated to an annealing temperature by increasing amplitudes of laser pulses from a laser that are applied to the reference layer 150 (FIG. 1). In one example, the pulse widths of the laser pulses are equal. In one particular example, the pulse widths of the laser pulses are less than 10 microseconds. As used herein, the annealing temperature of a reference layer is a temperature at which the reference layer changes its physical characteristics. Once a magnetic field is applied and after a cool down (i.e., ramp down) from the anneal temperature, the magnetization direction of the reference layer becomes fixed to a direction of the applied magnetic field. It would be understood by one of ordinary skill in the art that the annealing temperature of the reference layer is below a temperature that would destroy the electroconductive characteristics of the TMR.

Process 200 applies a magnetic field to the reference layer (206). For example, the reference layer 150 (FIG. 1) is exposed to a magnetic field having a magnetic field direction.

Process 200 holds the temperature of the reference layer at the annealing temperature of the reference layer (212). For example, the laser pulses applied to the reference layer 150 (FIG. 1) are kept at a constant amplitude for a time period that ensures that the magnetization of the reference layer 150 (FIG. 1) changes to the magnetic field direction of the applied magnetic field.

In one example, the pulse widths of the laser pulses are equal. In one particular example, the pulse widths of the laser pulses are less than 10 microseconds.

Process 200 ramps down the temperature of the reference layer from the annealing temperature of the reference layer (218). For example, the amplitude of successive laser pulses applied to the reference layer 150 (FIG. 1) are reduced. The rate of reduction of the amplitudes of the laser pulses is a rate that is slower than a rate of reduction of the amplitudes of laser pulses that would cause interstitial damage between layers of the TMR 100 (FIG. 1).

In one example, the pulse widths of the laser pulses are equal. In one particular example, the pulse widths of the laser pulses are less than 10 microseconds.

Figure 2B:
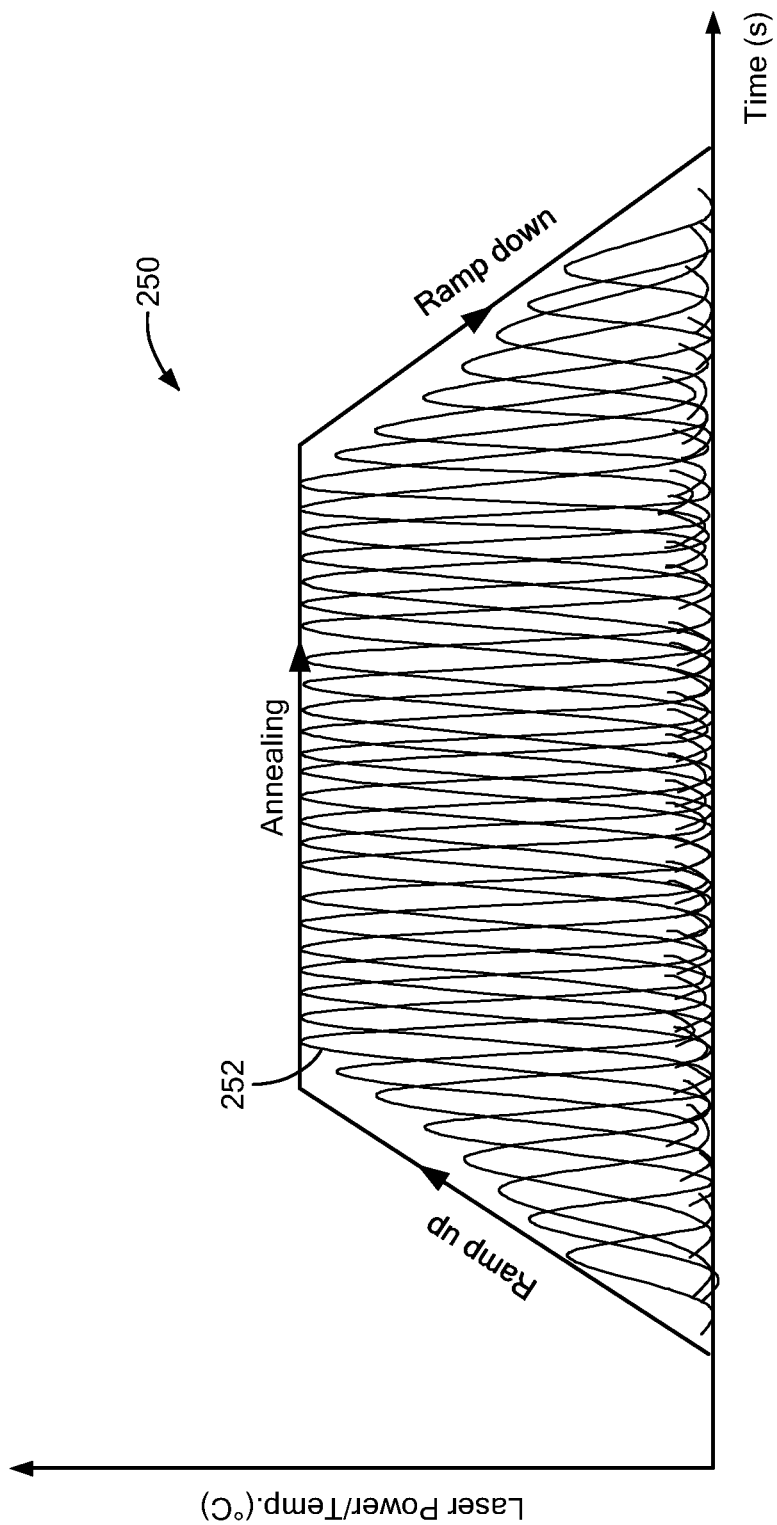
FIG. 2B is a graph of an example of laser power applied over time for the process of FIG. 2A.

Referring to FIG. 2B, an example of a graph of laser power applied over time for the process of FIG. 2A is a graph 250. The graph 250 includes a trapezoidal laser pulse profile 252 that includes an envelope of laser pulses.

Figure 3A:
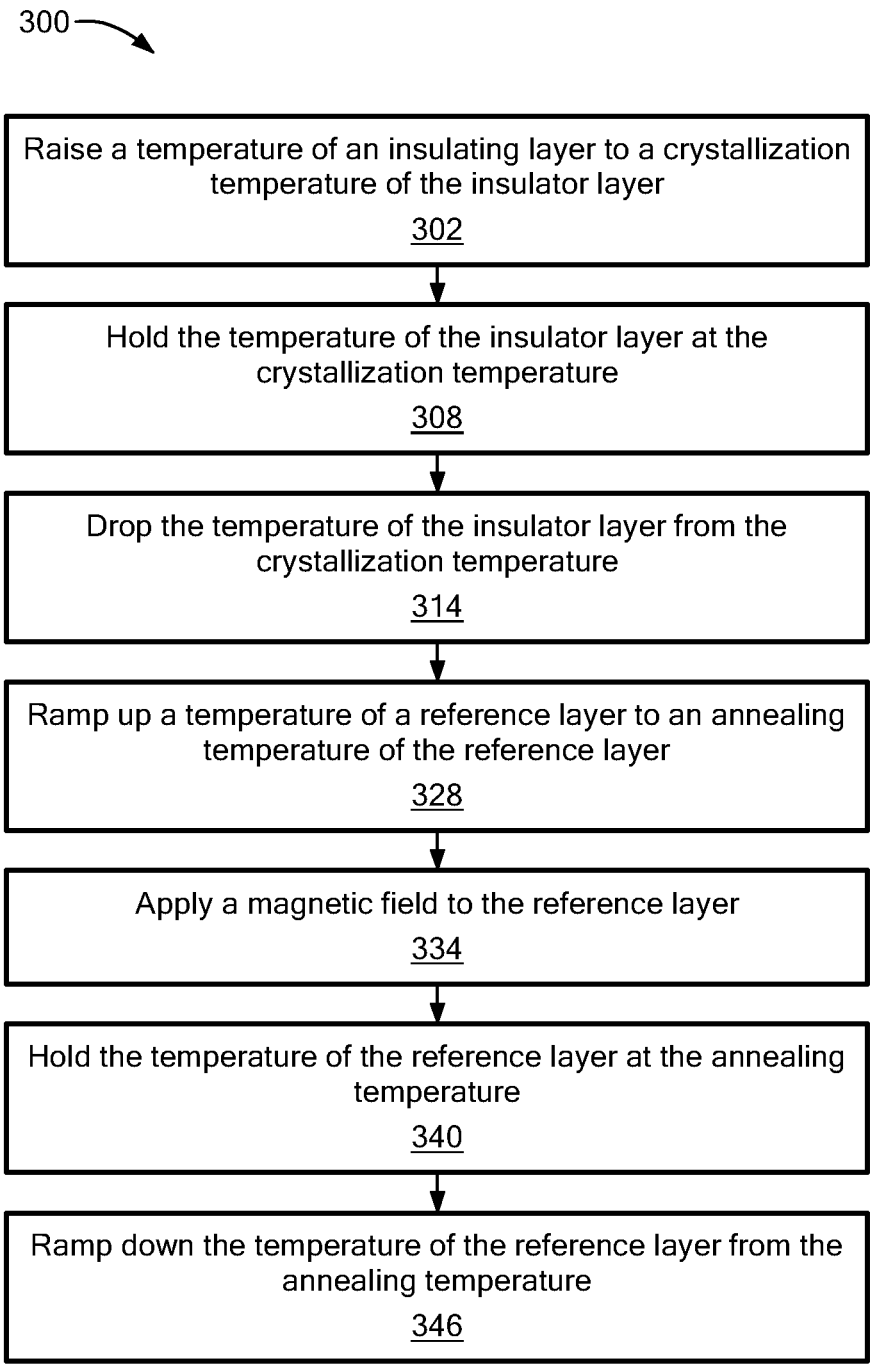
FIG. 3A is a flowchart of an example of a process to perform crystallization of an insulator layer and to pin a magnetization direction of the reference layer.

Referring to FIG. 3A, an example of a process to perform crystallization of an insulator layer and to pin a magnetization direction of the reference layer is a process 300. Process 300 raises a temperature of an insulator layer to a crystallization temperature of the insulator layer (302). For example, the MgO layer 126 (FIG. 1) is heated to its crystallization temperature by applying laser pulses of a constant amplitude to the MgO layer 126 (FIG. 1). As used herein the crystallization temperature is a temperature at which the insulator layer changes its electroconductive characteristics to allow current to tunnel from top to bottom of the TMR 100 (FIG. 1) during operation.

Process 300 holds the temperature of the insulator layer at the crystallization temperature of the insulator layer (308). For example, laser pulses applied to the MgO layer 126 (FIG. 1) are at a constant amplitude.

Process 300 drops the temperature of the insulator layer from the crystallization temperature (322). For example, the laser pulses applied to the MgO layer 126 (FIG. 1) cease.

Process 300 ramps up a temperature of a reference layer to an annealing temperature of the reference layer (328). For example, the reference layer 150 (FIG. 1) is heated to an annealing temperature by increasing amplitudes of laser pulses from a laser applied to the reference layer 150 (FIG. 1). In one example, the pulse widths of the laser pulses are equal. In one particular example, the pulse widths of the laser pulses are less than 10 microseconds.

Process 300 applies a magnetic field to the reference layer (334). For example, the reference layer 150 (FIG. 1) is exposed to a magnetic field having a magnetization direction.

Process 300 holds the temperature of the reference layer at the annealing temperature (340). For example, the laser pulses applied to the reference layer 150 (FIG. 1) are kept at a constant amplitude for a time period that ensures that the magnetization of the reference layer 150 (FIG. 1) changes to the magnetization direction of the applied magnetic field.

In one example, the pulse widths of the laser pulses are equal. In one particular example, the pulse widths of the laser pulses are less than 10 microseconds.

Process 300 ramps down the temperature of the reference layer from the annealing temperature (346). For example, the amplitude of the laser pulses applied to the reference layer 150 (FIG. 1) are reduced. The rate of reduction of the amplitudes of the laser pulses is a rate that is slower than a rate of reduction of the amplitudes of laser pulses that would cause interstitial damage between layers of the TMR 100 (FIG. 1).

In one example, the pulse widths of the laser pulses are equal. In one particular example, the pulse widths of the laser pulses are less than 10 microseconds.

Figure 3B:
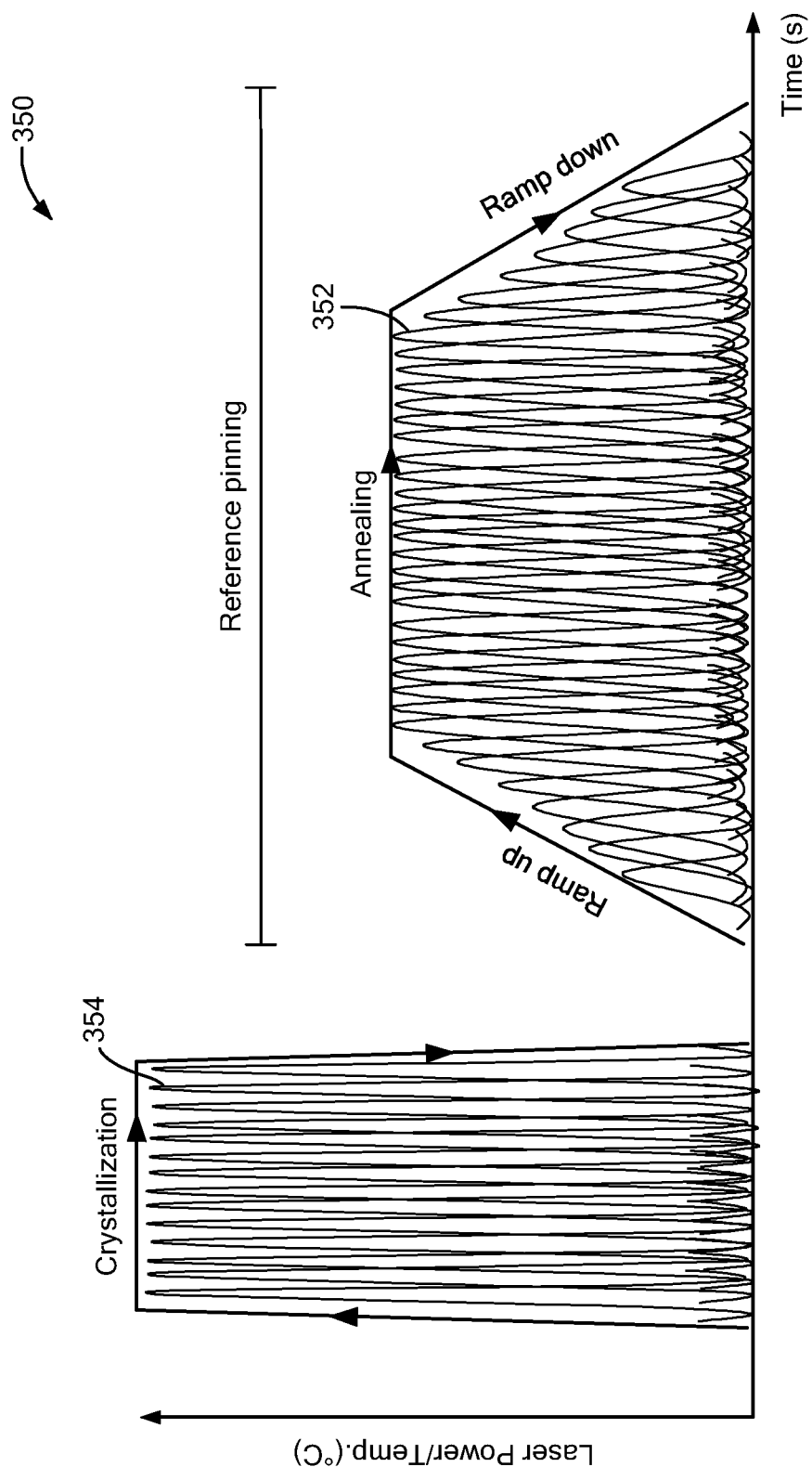
FIG. 3B is a graph of an example of laser power applied to the TMR over time for the process of FIG. 3A.

Referring to FIG. 3B, an example of a graph of laser power applied over time for the process of FIG. 3A is a graph 350. The graph 350 includes a trapezoidal laser pulse profile 352 for annealing and a trapezoidal laser pulse profile 354 for crystallization.

Figure 4A:
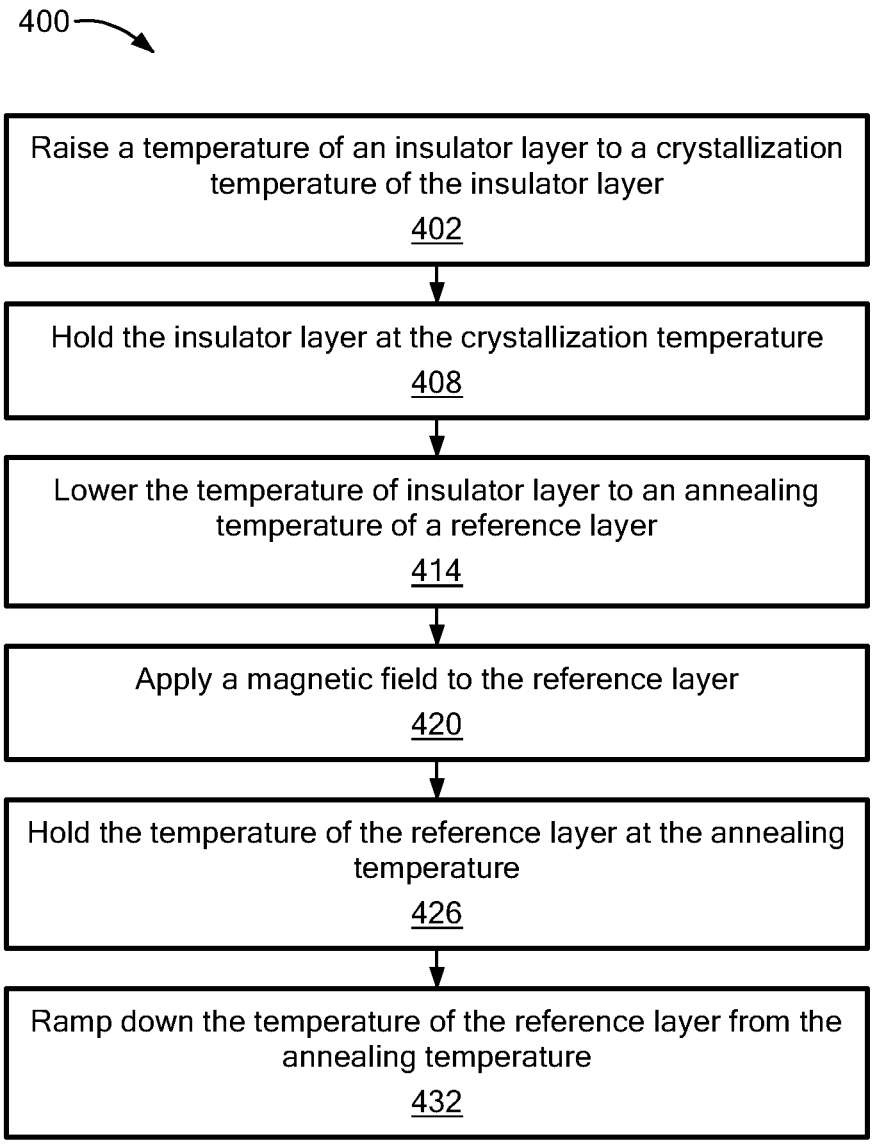
FIG. 4A is a flowchart of another example of a process to perform crystallization of the insulator layer and to pin a magnetization direction of the reference layer.

Referring to FIG. 4A, another example of a process to perform crystallization of an insulator layer and to pin a magnetization direction of the reference layer is a process 400. Process 400 raises a temperature of an insulator layer to a crystallization temperature of the insulator layer (402). For example, the MgO layer 126 (FIG. 1) is heated to its crystallization temperature by applying laser pulses of a constant amplitude to the MgO layer 126 (FIG. 1).

Process 400 holds the temperature of the insulator layer at the crystallization temperature of the insulator layer. For example, laser pulse applied to the MgO layer 126 (FIG. 1) are at a constant amplitude.

Process 400 lowers the temperature of the insulator layer from the crystallization temperature to an annealing temperature of the reference layer (414). For example, the laser pulses applied to the MgO layer 126 (FIG. 1) drops to the annealing temperature of the reference layer 126.

Process 400 applies a magnetic field to the reference layer (420). For example, the reference layer 150 (FIG. 1) is exposed to a magnetic field having a magnetization direction.

Process 400 holds the temperature of the reference layer at the annealing temperature (426). For example, the laser pulses applied to the reference layer 150 (FIG. 1) are kept at a constant amplitude for a time period that ensures that the magnetization of the reference layer 150 (FIG. 1) changes to the magnetization direction of the applied magnetic field.

In one example, the pulse widths of the laser pulses are equal. In one particular example, the pulse widths of the laser pulses are less than 10 microseconds. In one example, the pulse widths of the laser pulses are greater than the laser pulse widths used during crystallization of the insulator layer.

Process 400 ramps down the temperature of the reference layer from the annealing temperature (432). For example, the amplitude of the laser pulses applied to the reference layer 150 (FIG. 1) are reduced. The rate of reduction of the amplitudes of the laser pulses is a rate that is slower than a rate of reduction of the amplitudes of laser pulses that would cause interstitial damage between layers of the TMR 100 (FIG. 1).

In one example, the pulse widths of the laser pulses are equal. In one particular example, the pulse widths of the laser pulses are less than 10 microseconds.

Figure 4B:
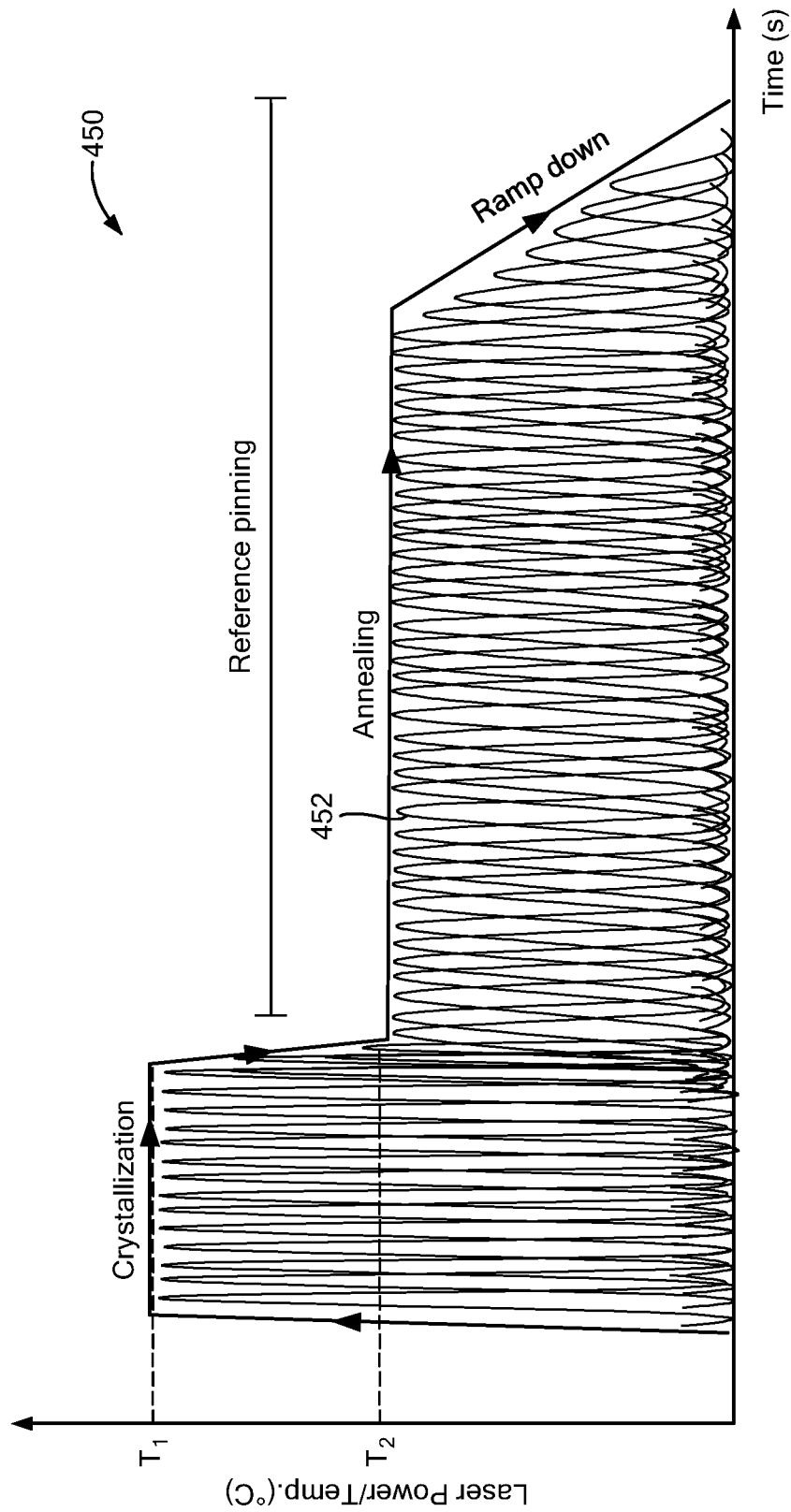
FIG. 4B is a graph of an example of laser power applied to the TMR over time for the process of FIG. 4A.

Referring to FIG. 4B, an example of a graph of laser power applied over time for the process of FIG. 4A is a graph 450. The graph 450 includes a trapezoidal laser pulse profile 452 for crystallization of the insulator layer and annealing of the reference layer.

Figure 5A:
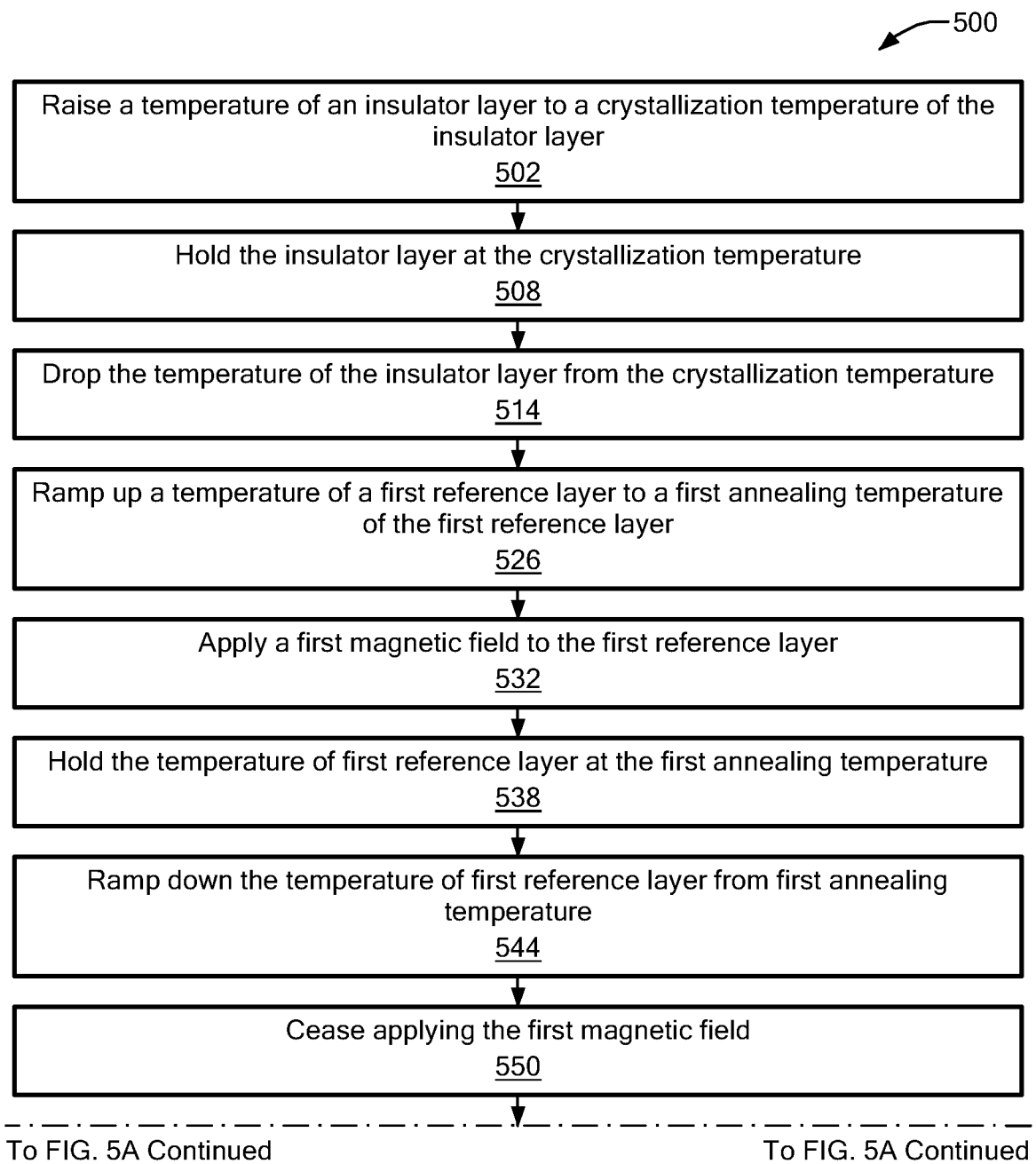
FIG. 5A is a flowchart of an example of a process to perform crystallization of the insulator layer, to pin a magnetization direction of a first reference layer and to pin a magnetization direction on a second reference layer.
Figure 5A:
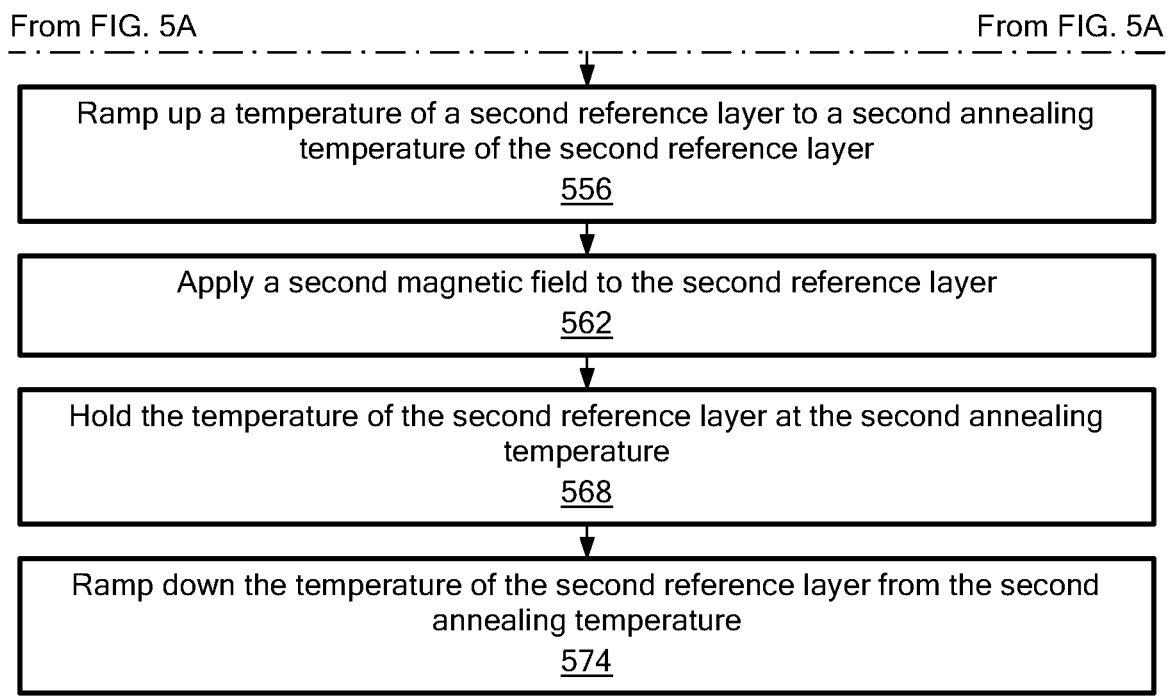

Referring to FIG. 5A, an example of a process to perform crystallization of the insulator layer, to pin a magnetization direction of a first reference layer and to pin a magnetization direction on a second reference layer is a process 500. In one example, the process 500 may be performed to fabricate TMR elements with more than one reference layer with different annealing temperatures. For example, one reference layer may be IrMn and the other may be PtMn.

Process 500 raises a temperature of an insulator layer to a crystallization temperature of the insulator layer (502). For example, an insulator layer (not shown) is heated to its crystallization temperature by applying laser pulses of a constant amplitude to the insulator layer.

Process 500 holds the temperature of the insulator layer at the crystallization temperature of the insulator layer (508). For example, laser pulses applied to the insulator layer 126 are at a constant amplitude.

Process 500 drops the temperature of the insulator layer from the crystallization temperature (514). For example, the laser pulses applied to the insulator layer cease.

Process 500 ramps up a temperature of a first reference layer to an annealing temperature of the first reference layer (526). For example, a first reference layer (not shown) is heated to an annealing temperature by increasing amplitudes of laser pulses from a laser that are applied to the first reference layer. In one example, the pulse widths of the laser pulses are equal. In one particular example, the pulse widths of the laser pulses are less than 10 microseconds.

Process 500 applies a first magnetic field to the first reference layer (532). For example, the first reference layer is exposed to a first magnetic field having a magnetic field direction.

Process 500 holds the temperature of the first reference layer at the annealing temperature of the first reference layer (538). For example, the laser pulses applied to the first reference layer are kept at a constant amplitude for a time period that ensures that the magnetization direction of the first reference layer changes to the magnetic field direction of the first magnetic field.

In one example, the pulse widths of the laser pulses are equal. In one particular example, the pulse widths of the laser pulses are less than 10 microseconds.

Process 500 ramps down the temperature of the first reference layer from the annealing temperature of the first reference layer (544). For example, the amplitude of the laser pulses applied to the first reference layer are reduced. The rate of reduction of the amplitudes of the laser pulses is a rate that is slower than a rate of reduction of the amplitudes of laser pulses that would cause interstitial damage between layers of a TMR.

In one example, the pulse widths of the laser pulses are equal. In one particular example, the pulse widths of the laser pulses are less than 10 microseconds.

Process 500 ramps up a temperature of a second reference layer to an annealing temperature of the second reference layer (556). For example, a second reference layer (not shown) is heated to an annealing temperature by increasing amplitudes of laser pulses from a laser that are applied to the second reference layer. In one example, the pulse widths of the laser pulses are equal. In one particular example, the pulse widths of the laser pulses are less than 10 microseconds.

Process 500 applies a second magnetic field to the second reference layer (532). For example, the second reference layer is exposed to a second magnetic field having a second magnetic field direction.

Process 500 holds the temperature of the second reference layer at the annealing temperature of the second reference layer (538). For example, the laser pulses applied to the second reference layer are kept at a constant amplitude for a time period that ensures that the magnetization direction of the second reference layer changes to the magnetic field direction of the second magnetic field.

In one example, the pulse widths of the laser pulses are equal. In one particular example, the pulse widths of the laser pulses are less than 10 microseconds.

Process 500 ramps down the temperature of the second reference layer from the annealing temperature of the second reference layer (544). For example, the amplitude of the laser pulses applied to the second reference layer 150 (FIG. 1) are reduced. The rate of reduction of the amplitudes of the laser pulses is a rate that is slower than a rate of reduction of the amplitudes of laser pulses that would cause interstitial damage between layers of a TMR.

In one example, the pulse widths of the laser pulses are equal. In one particular example, the pulse widths of the laser pulses are less than 10 microseconds.

Figure 5B:
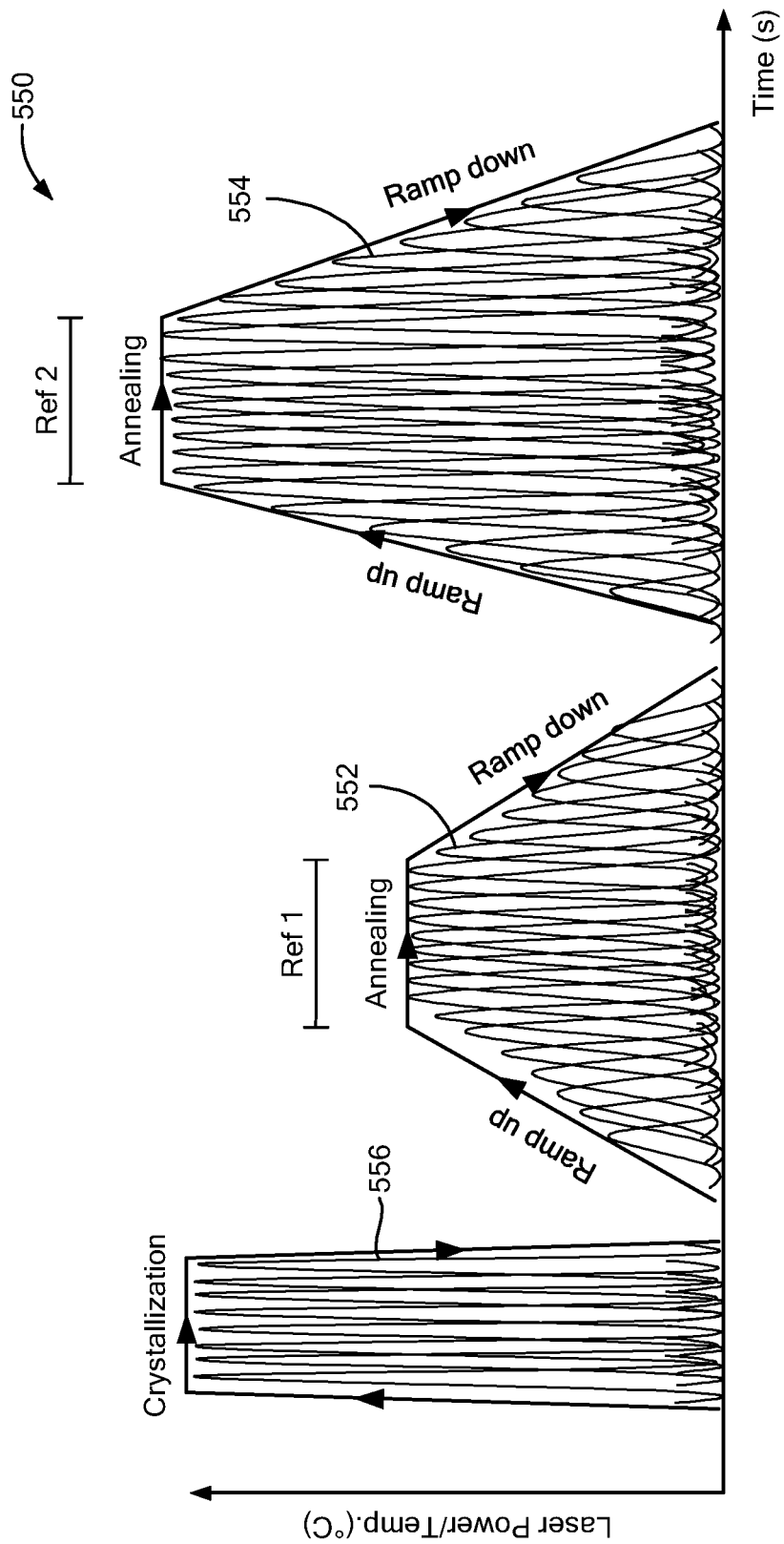
FIG. 5B is a graph of an example of laser power applied to the TMR over time for the process of FIG. 4A.

Referring to FIG. 5B, an example of a graph of laser power applied over time for the process of FIG. 2A is a graph 550. The graph 350 includes a trapezoidal laser pulse profile 552 for annealing on a first reference layer, a trapezoidal laser pulse profile 554 for annealing on a second reference layer 552 and a trapezoidal laser pulse profile 556 for crystallization.

Figure 6A:
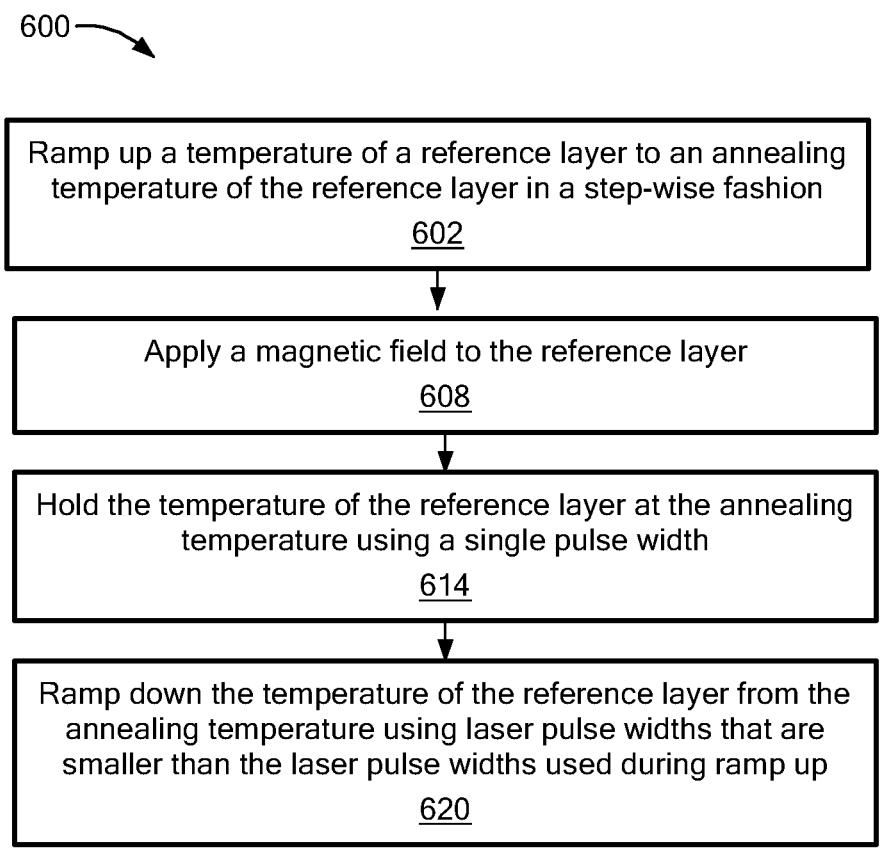
FIG. 6A is a flowchart of another example of a process to pin the magnetization direction of a reference layer.
Figure 6B:
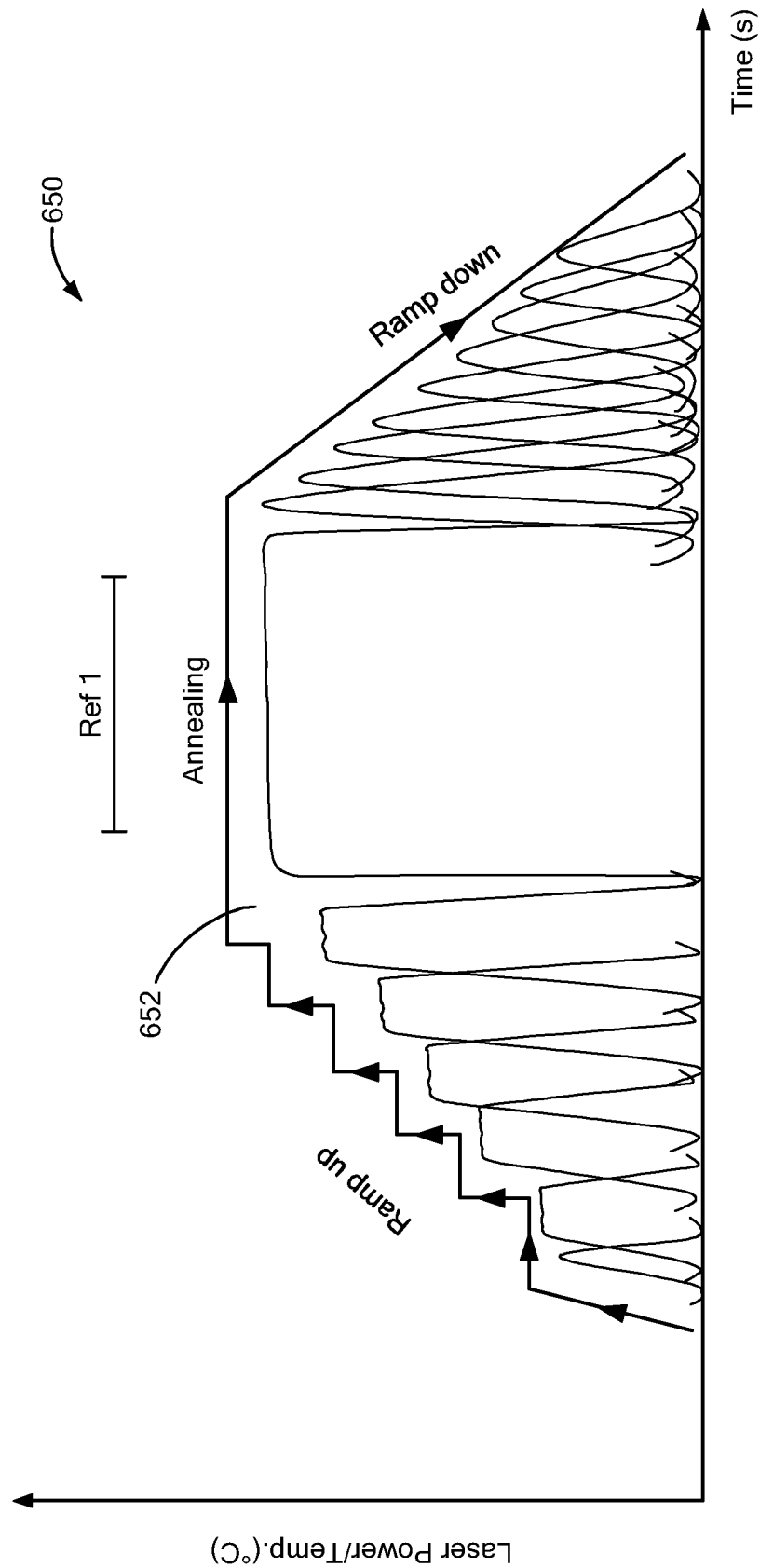
FIG. 6B is a graph of an example of laser power applied to the TMR over time for the process of FIG. 6A.

Referring to FIG. 6A, another example of a process to pin the magnetization direction of a reference layer is a process 600. Process 600 ramps up a temperature of reference layer to an annealing temperature in a step-wise fashion (602). For example, the reference layer 150 (FIG. 1) is heated to an annealing temperature by increasing amplitudes of laser pulses from a laser that are applied to the reference layer 150 (FIG. 1). Unlike in FIG. 2A, the laser pulse widths are wider (e.g., 10 to 500 microseconds wider) during ramp up to give a step-wise increases as shown in FIG. 6B. In one example, the pulse widths of the laser pulses are equal. In one particular example, the pulse widths of the laser pulses are greater than 20 microseconds.

Process 600 applies a magnetic field to the reference layer (608). For example, the reference layer 150 (FIG. 1) is exposed to a magnetic field having a magnetic field direction.

Process 600 hold annealing temperature using a single pulse width (614). For example, a single laser pulse with a width that encompasses an entire annealing time is applied to the reference layer 150 (FIG. 1).

Process 600 ramp down from annealing temperature using laser pulse widths that are smaller than the laser pulse widths used during ramp up (620). For example, the amplitude of the laser pulses applied to the reference layer 150 (FIG. 1) are reduced. The rate of reduction of the amplitudes of the laser pulses is a rate that is slower than a rate of reduction of the amplitudes of laser pulses that would cause interstitial damage between layers of the TMR 100 (FIG. 1).

In one example, the pulse widths of the laser pulses are equal. In one particular example, the pulse widths of the laser pulses are less than 10 microseconds.

Referring to FIG. 6B, an example of a graph of laser power applied over time for the process of FIG. 6A is a graph 650. The graph 650 includes a trapezoidal laser pulse profile 652.

The processes described herein are not limited to the specific examples described. For example, the processes 200, 300, 400, 500 and 600 are not limited to the specific processing order of FIGS. 2A, 3A, 4A, 5A and 6A, respectively. Rather, any of the processing blocks of FIGS. 2A, 3A, 4A, 5A and 6A may be re-ordered, combined, or removed, performed in parallel or in serial, as necessary, to achieve the results set forth above.

Having described preferred embodiments, which serve to illustrate various concepts, structures, and techniques, which are the subject of this patent, it will now become apparent to those of ordinary skill in the art that other embodiments incorporating these concepts, structures and techniques may be used.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A method of manufacturing a magnetoresistance (MR) element having layers, comprising:
raising a temperature of an insulator layer of the MR element to a crystallization temperature of the insulator layer by increasing an amplitude of laser pulses applied to the insulator layer over time to an amplitude that corresponds to the crystallization temperature of the insulator layer;
maintaining the amplitude of subsequent laser pulses over time that have the amplitude that corresponds to the crystallization temperature of the insulator layer until at least the insulator layer is crystallized;
after maintaining the amplitude of subsequent laser pulses over time that have the amplitude that corresponds to the crystallization temperature of the insulator layer, lowering the temperature of the insulator layer by reducing amplitudes of subsequent laser pulses applied to the insulator layer to a temperature that corresponds to an annealing temperature of a reference layer of the MR element;
applying the laser pulses that correspond to the annealing temperature of the reference layer of the MR element to the reference layer;
maintaining the amplitude of subsequent laser pulses over time that have the amplitude that corresponds to the annealing temperature of the reference layer until at least the reference layer is annealed; and
after maintaining the amplitude of subsequent laser pulses over time that have the amplitude that corresponds to the annealing temperature of the reference layer, ramping down the temperature of the reference layer by decreasing an amplitude of subsequent laser pulses applied to the reference layer over time.

2. The method of claim 1, wherein the reference layer comprises cobalt, iron and/or boron.

3. The method of claim 1, wherein the insulator layer is magnesium oxide.

4. The method of claim 1, wherein the MR element is a giant magnetoresistance element (GMR) or a tunneling magnetoresistance element (TMR).

5. The method of claim 1, wherein ramping down the temperature of the reference layer by decreasing an amplitude of subsequent laser pulses applied to the reference layer over time comprises decreasing amplitudes of subsequent laser pulses at a rate of reduction that is slower than a rate of reduction of amplitudes of laser pulses that would cause interstitial damage between the layers of the MR.

\* \* \* \* \*